Nov. 22, 1938.   G. HAGEDORN   2,137,909

DOUBLE SPOT WELDING

Filed May 10, 1937

G. Hagedorn
INVENTOR

By: Glascock Downing & Seebold
ATT'YS

Patented Nov. 22, 1938

2,137,909

UNITED STATES PATENT OFFICE 2,137,909

DOUBLE SPOT WELDING

Gerhard Hagedorn, Berlin-Halensee, Germany, assignor to Bernhard Berghaus, Berlin-Lankwitz, Germany Application May 10, 1937, Serial No. 141,796
In Germany May 16, 1936

3 Claims. (Cl. 219—10)

Almost all the arrangements hitherto known for double or multiple spot welding are based on the use of counter-electrodes, so that fundamentally they are only a multiplication of the single spot welding. On the other hand, double spot welding without counter-electrodes is of great advantage. Apart from the fact that it allows two spots to be simultaneously treated, it dispenses with the use of electrode arms which are heavy and often project to a considerable extent, as well as with the use of inconvenient welding handles and tongues, which devices, owing to the great voltage drops and losses, introduce great disadvantages, especially from an electrical point of view, and are unsuitable for carrying out the welding on bulky work pieces and on large metal constructions.

The economical use of double-spot welding without counter-electrodes hitherto failed in practice owing to the fact, that the welding current, especially in the case of thick metal sheets, flows preponderantly through the metal sheet on which the adjacent electrodes rest. Therefore, a large proportion of the current does not take part in the welding but, has on the contrary a detrimental effect, by heating the metal sheet on which the electrodes rest thereby causing it to become distorted. It has not hitherto been possible to remove this difficulty, by using simple means. It has been proposed to work with a blind electrode (viz., an electrode having such a large abutting surface that welding does not take place owing to the small circuit density), which rests on the lower welding work so that only one spot is always welded. This arrangement, however, is useful only when the lower material lies free, and is thus to be regarded as pertaining to the single-spot welding.

Further, in order mutually to compensate the transverse currents, viz., the currents in the two metal sheets between the electrodes, welding machines have been provided with an upper and a lower transformer which were connected in series on the secondary side. In this way two single-spot welds are again produced by using four electrodes, each two of which must lie exactly opposite one another, for which reason this method is useful also only for stationary welding plants and is limited to the welding of pieces which are not too bulky. Moreover, the consumption is considerable and the use of double the number of electrodes is particularly inconvenient.

The object of the invention is to avoid the drawbacks referred to in the method of double-spot and seam welding with only two adjacent electrodes.

The characteristic feature of the invention is that the ratio of the current which flows between the two single electrodes connected to the secondary winding of the welding transformer in the part of the work to be welded on which the electrodes rest, to the current which flows through the work to be welded that lies underneath, is reduced by current displacing means.

The change in the conditions of the current or the reduction in current in the part of the work to be welded on which the electrodes rest, may, for instance, be effected by the provision of magnetic materials, such as solids or laminated iron, between the two electrodes. Further magnetic fields which change the current ratio, or reduce the current in the part of the work to be welded, on which the electrodes rest, may preferably be caused to act on the welding work. The primary or secondary welding current, or the primary or secondary welding voltage may feed the magnetic field to displace the current.

The invention also relates to a device for carrying out the method described, the essence of which consists in the provision of solid or laminated iron between the electrodes. The device for carrying out the method may also preferably consist of an electromagnet between the electrodes, which is so arranged that the current is reduced especially in the upper welding work. The electromagnet is preferably so arranged above the metal sheets on the surface of the electrodes that the magnetic flux passes through the loop formed by the transformer, the electrodes and the two metal sheets. Such fields may also consist of one or several additional conductors or windings, with or without iron core, which are arranged in the effective proximity of the welding work and which are connected in series or parallel with the primary or secondary welding circuit or are fed from any desired source of current.

The invention thus provides a solution of the double-spot welding without counter-electrodes, which numerous experiments have already proved to be successful in practice, according to which the detrimental proportion of current flowing through the upper welding work is considerably reduced. Whilst in the case of a conductor in the air, the current density on the whole surface is increased with increasing frequency of the currents (skin effect), the conditions are altered if the formation of the magnetic field due to the current flowing through the conductor is disturbed, for instance by the approach of iron from one side. The field then passes partly transversely through the conductor. The sections of the conductor lying nearest to the iron are surrounded by the largest magnetic flux. Consequently the highest counter-voltages are produced therein, which, on the other hand, means, that the current density in the proximity of the iron is reduced.

The method according to the invention consists in that the magnetic conductivity of the field produced by the current passing through the welding work is increased on one side, preponderantly on the side of the electrodes and between the latter, or by causing alternating magnetic fields to act additionally to the magnetic field due to the current, which alternating fields have the same frequency as the welding current and the suitable phase and act inductively on the welding work in such a manner that the current is reduced in the conductor lying on the side of the electrodes.

In many cases, it is sufficient, according to the invention, to introduce iron between the two electrodes as near as possible to the welding work, whereby the current is displaced in the outer welding work.

In other cases, and in order to obtain an increased displacement of the current, it is an advantage to produce additional magnetic fields by the provision of conductors or windings carrying currents, with or without an iron core, in the effective proximity of the welding work, which conductors or windings are connected in parallel or series with the primary or secondary welding circuit or may be fed from an external source of current of the same frequency, the phase being suitably chosen. Further, a transverse magnetic field may be produced by the provision of a separately excited electromagnet.

One possible way of reducing the transverse current also in the lower metal sheet consists in placing the welding work on a non-magnetic, thermally and electrically good conducting metal which absorbs a portion of the transverse current and at the same time accelerates the removal of the heat due to the current.

The action of the current displacement increases considerably with the thickness of the metal sheet, which fact is especially important, since hitherto it was in connection with thick metal sheets (of approximately over 1 mm.) that the use of double-spot welding without counter-electrodes was not found practicable.

The improved method of double-spot welding without counter-electrodes is applicable to spot and seam welding of all metallic materials, such as iron, steel or light metals, such as aluminium, "Electron", "Hydronalium", etc.

The invention is illustrated diagrammatically and, by way of example, in the accompanying drawing, in which.

Figure 1:
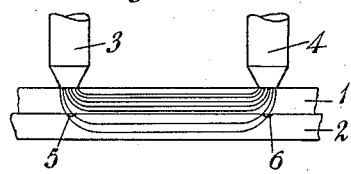
Figure 1 shows diagrammatically, the current distribution in the welding work without the application of the invention

Figure 1 illustrates diagrammatically by means of current lines the distribution of the current in the two metal sheets 1 and 2, when the magnetic field is not altered. 3 and 4 are the two welding electrodes which are connected to the secondary of a welding transformer which is not shown. The welding spots are produced at the points 5 and 6.

From Figure 1 it will be seen that the main portion of the current, for instance 70–80% flows through the upper metal sheet 1, whilst but very little current flows through the lower sheet so that the welding points 5 and 6 receive but little current and therefore the welding points which are produced are not good. On the other hand, the upper metal sheet 1 is overheated to an inadmissible extent between the two electrodes 3 and 4.

Figure 2:
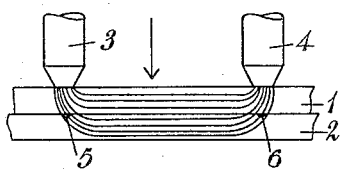
Figure 2 shows the current distribution when the invention is applied thereto.

Figure 2 illustrates by means of current lines the distribution of the current in the metal sheets 1 and 2, when the method according to the present invention is applied thereto. The arrow indicates the direction of the main effect produced by the current displacing means hereinafter described with reference to Figures 3 to 10. It will be seen that now substantially less current flows through the upper metal sheet 1 than through the lower metal sheet 2, so that in this case the welding points 5 and 6 are traversed by a substantially greater current, so that perfect welding is obtained. Moreover, the upper metal sheet is no longer overheated between the electrodes 3 and 4. By the method according to the invention, the current in the upper metal sheet 1 can be reduced to any desired extent, so that only 50%, 40%, 30% or less than 20% of the current flows for instance through the upper sheet. The current ratio to be maintained depends entirely upon the materials to be welded together.

Figure 3:
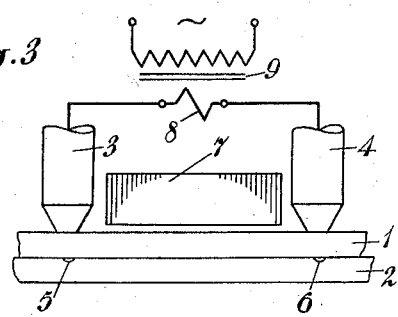
Figures 3 and 4 show in elevation and side view respectively one form of carrying out the invention by the provision of laminated iron between the electrodes.
Figure 4:
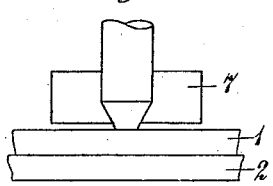

Figure 3 illustrates an arrangement in which laminated iron is provided between the electrodes 3 and 4 which are connected to the secondary 8 of the welding transformer 9. Figure 4 is a side view of this arrangement. In one experiment, the current in the upper metal sheet, when no iron was provided, amounted, for example, to substantially more than double the useful welding current. By keeping the total current the same, and inserting the iron 7 between the electrodes, the welding current in the lower metal sheet was increased by 40%, which means an increase of about 100% in the heat due to the current in the welding spots 5 and 6.

Figure 5:
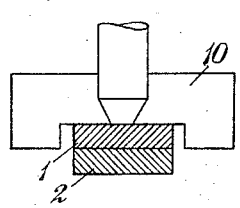
Figure 5 shows an arrangement in which the iron partly surrounds the welding work.

In the arrangement according to Figure 5, which may be used for the welding of certain profiles, the iron 10 surrounds the welding work 1, 2 partly, whereby the effect of the current displacement is increased.

Figure 6:
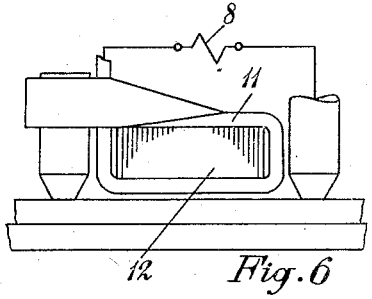
Figure 6 illustrates an arrangement in which the iron is surrounded by a winding.

Figure 6 illustrates the additional arrangement of a winding 11 around the iron 12 which in this case is connected in series with the secondary welding circuit. In one experiment the transverse current in the upper metal sheet, when the welding was not influenced by the means provided by the present invention, amounted, for instance, to 2.8 times the useful welding current. Under the same welding conditions and by keeping the total current the same, when the welding was carried out by using an arrangement according to Figure 6, the welding current in the lower metal sheet increased to the extent of 110%, which means an increase of about 350% in the heating due to the current in the welding spots. The effect can be increased still further by embedding the additional conductor 11 in the iron, so that the iron lies nearer to the welding work. A further increase in the displacement of the current may be obtained by providing a second, and, if desired, a third, winding over the first one, so that the welding work represents the third or fourth conductor, counted from the iron.

A further method of increasing the effect of the current displacement consists in arranging the additional conductor in the form of a current bridge between the electrodes, that is to say, by connecting it in parallel with the welding work. In this way also the height of the conductor is increased, which results in a very great increase in the displacement of the current. The current loss caused by this bridge, owing to the very small current density arising therein, is unimportant in comparison with the gain in current in the welding spots by the increased current displacement.

Figure 7:
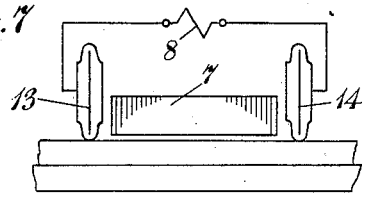
Figures 7 and 8 show in elevation and side view respectively the application of the invention to seam welding by means of rollers.
Figure 8:
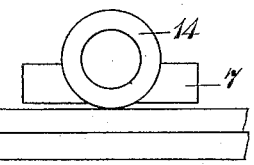

Figures 7 and 8 illustrate the application of the invention to seam welding by means of rollers. 13 and 14 are the two welding rollers, which are connected to the secondary coil of the welding transformer, and 7 is again the iron provided between the electrodes, in this case, the rollers.

Figure 9:
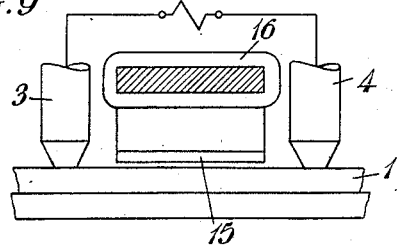
Figures 9 and 10 show in elevation and side view respectively the provision of an electromagnet between the electrodes.
Figure 10:
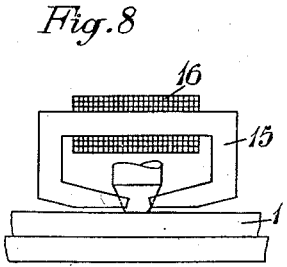

Figures 9 and 10 illustrate the arrangement of an electromagnet 15 between the electrodes 3 and 4, the exciting coil 16 of which is fed with a current of suitable phase and the same frequency. Owing to the air gap between the poles, a strong stray field is operative in the upper metal sheet, which also effects an increase in the current displacement.

What I claim is:

1. A method of double spot and seam welding of two parts by means of only two adjacent electrodes resting on one of the two parts to be welded together consisting in displacing the current flowing between the electrodes through the part on which the two electrodes rest towards and into the other part by increasing the magnetic conductivity between the electrodes on the electrode side, for the purpose of reducing the ratio between the current flowing between the electrodes in the part on which they rest and the current flowing through the other part to be welded thereto.

2. A method of double spot and seam welding of two parts by means of only two adjacent electrodes resting on one of the two parts to be welded together consisting in causing magnetic fields between the electrodes on the electrode side to displace the current flowing between the electrodes through the part on which the two electrodes rest towards and into the other part, for the purpose of reducing the ratio between the current flowing between the electrodes in the part on which they rest and the current flowing through the other part to be welded thereto.

3. An apparatus for double spot and seam welding of two parts by means of only two adjacent electrodes resting on one of the two parts to be welded together, comprising a welding transformer having a primary and a secondary, the latter being connected to the said two electrodes, and an iron body between the electrodes, whereby when the electrodes rest on one of the parts to be welded together, the said iron body displaces the current flowing between the electrodes through the part on which the electrodes rest towards and into the other part and the ratio between the current flowing between the electrodes in the part on which they rest and the current flowing through the other part is reduced.

GERHARD HAGEDORN.